United States Patent [19]

Bast

[11] Patent Number: 4,508,051

[45] Date of Patent: Apr. 2, 1985

[54] APPARATUS FOR APPLYING VISCOUS SUBSTANCES PARTICULARLY ADHESIVES

[75] Inventor: Wilhelm Bast, Mucke-Nieder-Ohmen, Fed. Rep. of Germany

[73] Assignee: Faust-Fertigungstechnik GmbH & Co. KG, Fed. Rep. of Germany

[21] Appl. No.: 429,979

[22] Filed: Sep. 30, 1982

[30] Foreign Application Priority Data

Oct. 16, 1981 [DE] Fed. Rep. of Germany ....... 3141112

[51] Int. Cl.³ .............................................. B05C 5/02
[52] U.S. Cl. .................................... 118/410; 118/323; 118/415
[58] Field of Search ................. 118/323, 410, 411, 415

[56] References Cited

U.S. PATENT DOCUMENTS 2,281,169 4/1942 Pattison .......................... 118/323 X
4,015,560 4/1977 Paul ..................................... 118/323

Primary Examiner—John P. McIntosh
Attorney, Agent, or Firm—Cantor and Lessler

[57] ABSTRACT

An apparatus for the automatic application of an adhesive bead to the frame flange of a window opening of a vehicle body has an all-round rail shaped in accordance with the flange and on which moves a carriage. The carriage supports a discharge nozzle by means of a guide column and a bracket arm, which is pivotable radially outwards with respect to the latter, in such a way that the nozzle can move to a limited extent relative to the carriage. The mobility of the discharge nozzle is controlled by a scanning wheel, which is located in the window frame when the apparatus is in operation.

5 Claims, 4 Drawing Figures

4,508,051

APPARATUS FOR APPLYING VISCOUS SUBSTANCES PARTICULARLY ADHESIVES

BACKGROUND OF THE INVENTION

This invention relates to an apparatus for applying viscous substances, for example adhesives to the frame flanges of window openings in motor vehicles. In the construction of automobiles, recently window panes have frequently been bonded to the frame flanges of window openings, instead of being inserted in rubber packings. This has safety advantages, because a bonded window pane will less readily fall out of the window in the case of an accident, than a pane which is fitted therein. In addition, bonded window frames additionally reinforce the body and reduce air resistance.

For bonding window panes to the window flanges the procedure has hitherto been to manually apply an all-round adhesive bead by means of an applicator, after which the pane with the adhesive bead is pressed onto the frame flange in the window opening. However, this takes a relatively large amount of time and requires high concentration and considerable skill from the worker to ensure that the adhesive bead is always uniformly applied and subsequently the pane is accurately fitted into the window opening.

From the assembly standpoint, it would be ideal to have an apparatus enabling the adhesive bead to be applied to the frame flange of the window opening instead of to the pane, because it is easier to handle the pane without adhesive and to introduce it into the correct position with respect to the window opening. However, it has hitherto proved impossible to develop an automatic apparatus for applying adhesive to a frame flange, owing to the necessary high accuracy of the adhesive quantity applied and the necessary exact positioning of the adhesive bead on the frame flange.

The main problem to be solved with such an apparatus is that the frame flange of the window opening is not suitable for supporting and guiding a discharging device, because it has too small an area, frequently too abrupt deflections in the corners and through being painted is too smooth, in order to produce e.g. by means of a friction wheel an accurate and uniform feed speed of the applicator on the path thereof. If, for example, a guide wheel were to be placed on the window frame and said wheel was allowed to determine the feed speed of the discharging device, the speed of the latter in the corners would be much less than in the straight areas, because the discharge nozzle is closer to the centre of curvature in the corners than the guide wheel and would therefore have to cover less distance in taking a curve than would the guide wheel. As a result, more adhesive would be applied to the corner areas than in the straight areas of the frame flanges. On inserting the window pane, this adhesive would then flow out of the corners, giving an unattractive appearance and impeding the insertion of a decorative strip between the outer edge of the window pane and the window frame.

SUMMARY OF THE INVENTION

The object of the present invention is to provide an apparatus for applying viscous substances, particularly adhesives, to the frame flanges of window openings of motor vehicles, which operates automatically and makes it possible to apply a uniformly thick material bead to all areas of the frame flange.

Accordingly, the invention provides apparatus for applying viscous substances, for example adhesives, to the frame flanges of window openings in motor vehicles, said apparatus comprising an all-round rail shaped in accordance with a window opening to the frame of which said viscous substances are to be applied, a carriage displaceably arranged on said rail, and a discharge nozzle and a scanning unit mounted on said carriage, said scanning unit being engageable with the frame flange of said window opening and having limited mobility with respect to said carriage.

In the case of the apparatus according to the invention, the carriage is completely supported on the all-round rail and is substantially correctly guided, corresponding to the shape of the frame flange. As a result of the scanning unit, or followers, in the window opening, the discharge nozzle path is corrected, so that even in the case of rough tolerances, the material bead is always applied in precisely the correct area of the frame flange, parallel to its outer edge. As the carriage moves largely on the path of the material bead due to the rail carrying it, it is sufficient to uniformly drive this carriage in order to produce a uniformly thick material web. Speed changes of the discharge nozzle caused by variations in the path configuration between rail and frame flange are negligible. The decisive point is that, as a result of the present invention, the discharge nozzle position takes account of these variations, so that the material bead is precisely parallel to the flange. Apart from adhesives, the apparatus according to the invention could also be used e.g. for applying sealants.

According to a preferred embodiment of the invention, the discharge nozzle is held by a radially outwardly pivotable bracket arm with respect to the all-round rail, in which said bracket arm is mounted on a guide column displaceable at right angles with respect to the plane of said rail and held by said carriage, and in which said bracket arm is provided with a scanning wheel for scanning the window opening contour. In this embodiment, the discharge nozzle is corrected in the window opening plane by a pivoting movement of the bracket arm. This pivoting movement can be performed with less friction than e.g. a linear movement in a straight-line mechanism. Apart from this, the apparatus is made robust by these constructional features so that it is able to work faultlessly even under severe operating conditions. The pivotability of the bracket arm also makes it easier to bring the apparatus into the correct position above the window openings to which the adhesive is to be applied.

The bracket arm may be articulated to a slide which is radially movable with respect to the all-round rail and which is movable on cross-rails of the guide column. This arrangement is particularly advantageous when applying an adhesive bead to frame flange in the case of a highly curved window pane. In order in such cases to be able to apply a uniformly thick adhesive bead in dimensionally accurate manner to the frame flange, the discharge nozzle must always be perpendicular to the flange. This necessitates a centre offset of the discharge nozzle with respect to the rolling line of the carriage drive chain. This centre offset can easily be realised by the radially movable slide according to the invention.

The degree of slide movement can easily be fixed if the slide is radially outwardly biased by a spring with respect to the all-round rail and engages by a roller against a fixed guideway. The guideway can naturally also be shaped in such a way that the discharge nozzle is not perpendicular to the flange frame, at least in certain areas thereof, if this is desired for influencing the thickness or position of the adhesive bead.

In certain vehicles, the shoulder height of the frame flange is too low or does not exist in certain areas, so that a scan is no longer possible. This is often the case with windshields in the vicinity of the hood. For such cases, a guide wheel is desirably arranged on said bracket arm and is arranged to be applied to a fixed auxiliary cam over part of the path of said carriage on the rail. As a result of this arrangement, an adhesive bead can still be correctly applied in such cases.

Preferably, a chain is mounted on said rail and the carriage is advanced by means of a chain wheel which engages with the chain on said rail, the rolling line on said chain being aligned with the axis of the discharge nozzle in the operating position.

As a result of this form of carriage drive, it is made particularly easy to move the carriage substantially uniformly over the frame flange, because even in the area of abrupt deflections, the chain can be applied relatively well to the rail along the course of the frame flange.

The apparatus can be applied very satisfactorily to a vehicle body above a window opening and can be accurately oriented, if contour blocks and pneumatically operable clamping groups are provided for securing the apparatus to a vehicle body.

BRIEF DESCRIPTION OF THE DRAWINGS

The invention will now be further described, by way of example, with reference to the drawings in which.

In the drawings, like parts are denoted by like reference numerals.

DESCRIPTION OF PREFERRED EMBODIMENTS

Figure 1:
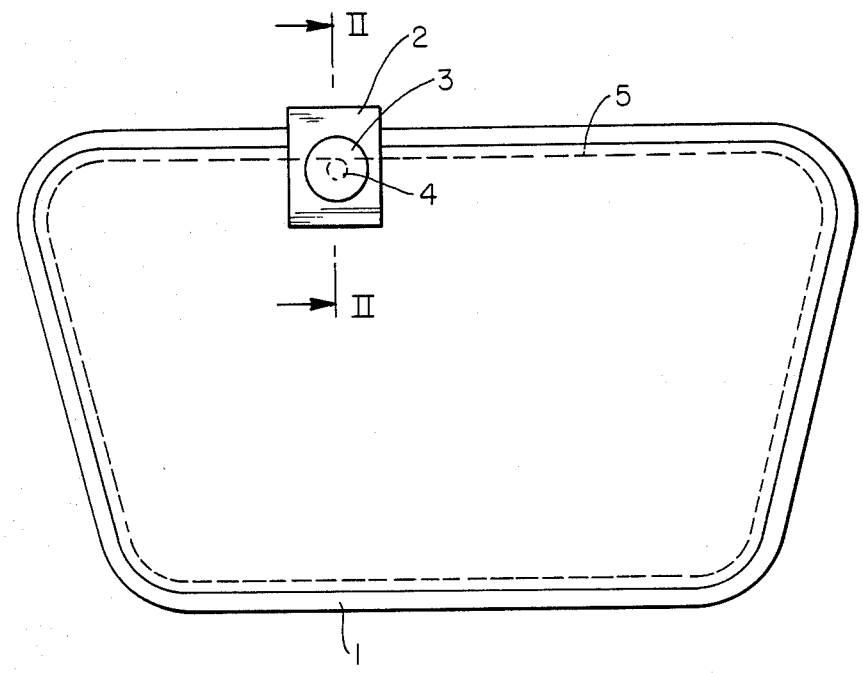
FIG. 1 is a basic diagram of one embodiment of an apparatus according to the invention, viewed from above.

Referring to the drawings, FIG. 1 shows a rail 1 which is shaped in accordance with the contour of a window opening (not shown). A carriage 2 is supported on the rail 1, which carriage is driven by a motor 3 and can move along the rail 1. The advance of the carriage 2 takes place through it engaging by means of a chain wheel 4 in a chain 5, provided on the inside of the rail 1 and aligned as accurately as possible with the axis of the adhesive bead to be applied to the frame flange.

Figure 2:
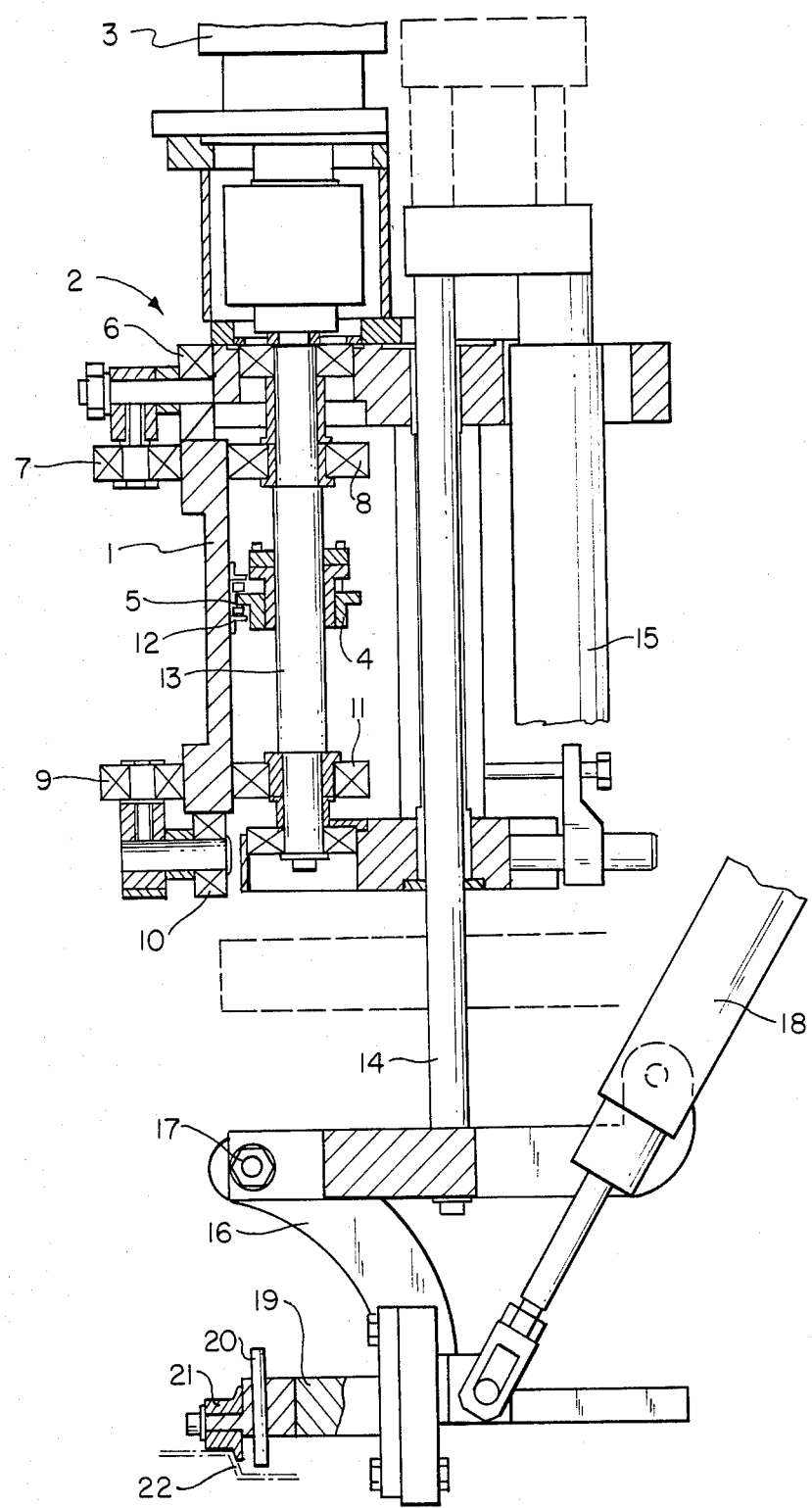
FIG. 2 is a cross-section through the apparatus taken along line II—II in FIG. 1 in the direction of the arrows and on a larger scale.

FIG. 2 shows, on a greatly increased scale, the rail 1, on which is supported the carriage 2. The carriage 2 with guide wheels 6 to 11 engaged around the rail 1 from above, below and both sides. FIG. 2 also shows the chain 5, which is fixed by mounting supports 12 to the inside of the rail 1. The chain wheel 4, which is located on a drive shaft 13 arranged to be driven by the motor 3, engages in the chain 5.

A guide column 14 is vertically positioned in the carriage and is mounted in an axially displaceable manner by means of a pneumatic cylinder 15. At the lower end of the guide column 14 a bracket arm 16 is mounted in such a way that it can be pivoted about a spindle 17 at right angles to the rail 1 by means of a further pneumatic cylinder 18. The bracket arm 16 has at its lower end an arm 19 which supports a discharge nozzle 20 and a scanning wheel 21 on the outside and radially with respect thereto. A frame flange 22 of a window opening to which is to be applied a window bead is shown by broken lines in FIG. 2. The scanning wheel 21 is located on the window frame laterally of the frame flange 22. The scanning wheel can be replaced by a shoe, which slides along the frame flange 22 and consequently accurately guides the discharge nozzle 20. Adhesive is also supplied (in a manner not shown) from a barrel by means of a barrel pump and metering device via a tube leading to the discharge nozzle 20.

Contour blocks and pneumatically operable clamping groups are not shown, but they make it possible to fit the complete apparatus from above on a vehicle body above a window opening to be provided with adhesive.

The aforementioned apparatus functions as follows. The apparatus is firstly brought by means of a crane to approximately 200 mm above the vehicle body and by means of a weight balance is manually positioned by means of a preadjusting and centering means and is then pneumatically secured by means of the contour blocks. The carriage 2 and simultaneously the adhesive barrel pump are then switched on. The carriage 2 starts to move along the rail 1, so that the discharge nozzle 20 can apply an adhesive bead to the frame flange 22. Owing to the fact that, during the movement of the carriage 2, the scanning wheel 21 is always positioned in the window opening, a parallel positioning of the adhesive bead is ensured, even in the case of rough body tolerances.

Figure 3:
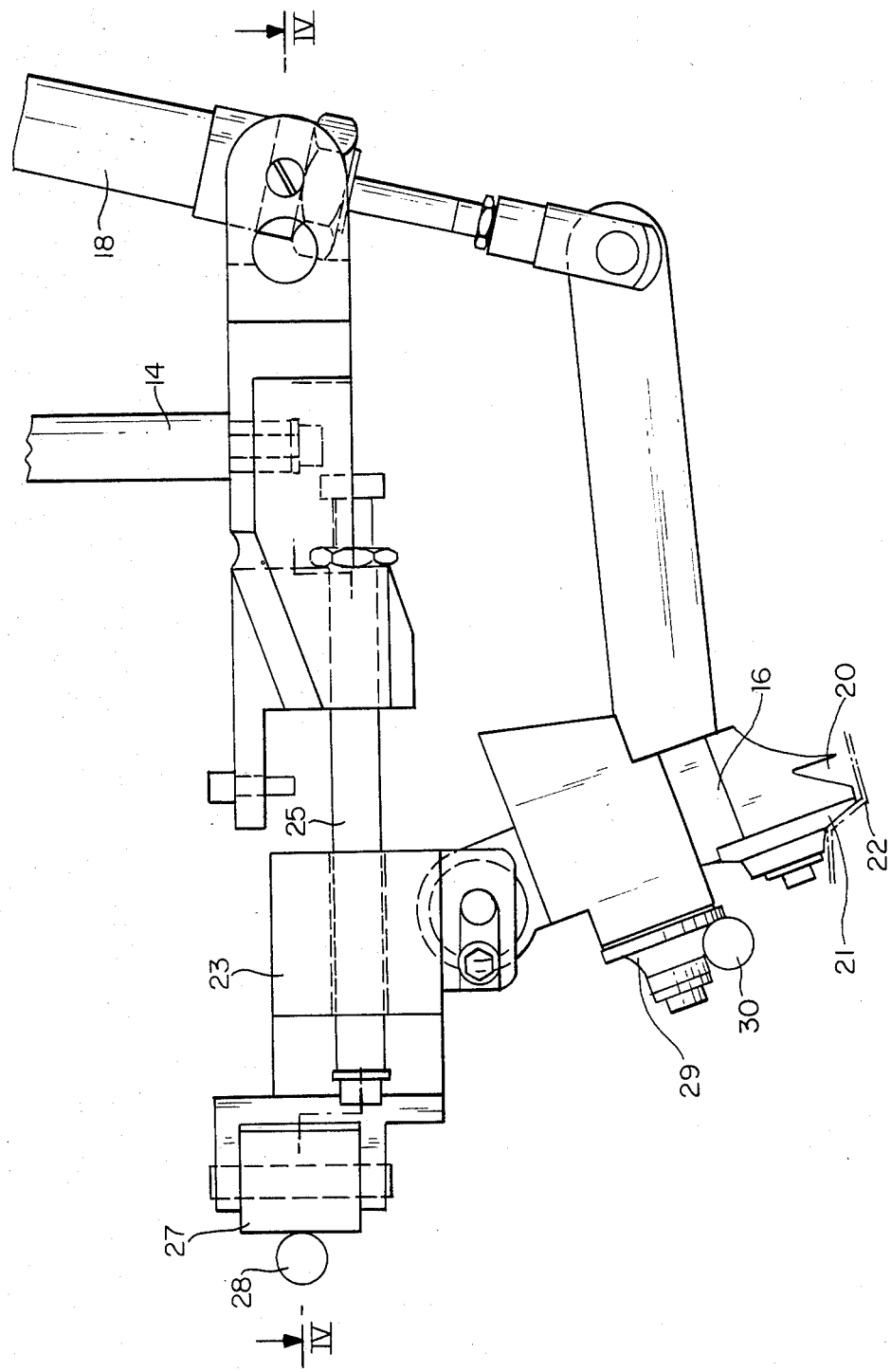
FIG. 3 is a side view of a modified embodiment of the apparatus in the vicinity of the discharge nozzle.
Figure 4:
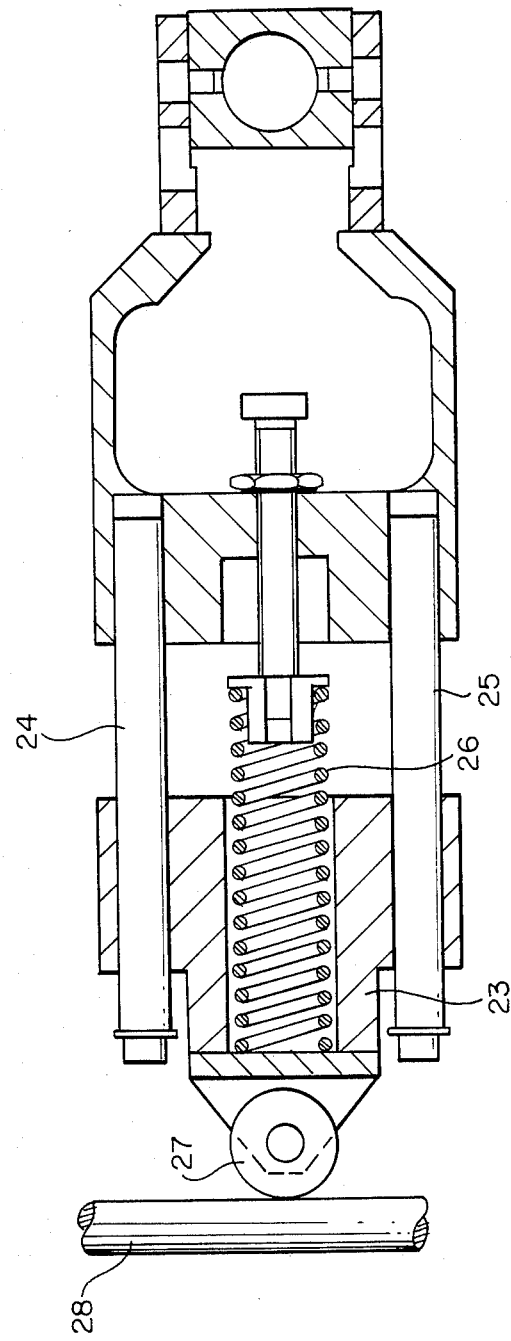
FIG. 4 a section through the apparatus taken along line IV—IV in FIG. 3 in the direction of the arrows.

FIG. 3 firstly shows the components known from FIG. 2, particularly the discharge nozzle 20 applied to the bracket arm 16 and the pneumatic cylinder 18, which is able to radially pivot said arm 16. The bracket arm 16, unlike in the previously described embodiment, is fitted to a slide 23, which can be moved on two cross-rails 24, 25 of the guide column 14 at right angles to the rail 1 shown in FIG. 1. As shown in FIG. 4, the slide 23 is biassed towards the outside by a spring 26, i.e. to the left in the drawing, so that it is always in engagement with a guideway 28 by means of an external, cylindrical roller 27.

As a result of this construction, the discharge nozzle 20 is held on the frame flange 22 through the pivotability of the bracket arm 16 in the same way as in the previous embodiment, but the angular position of the nozzle is fixed by the course of the guideway 28. As a result, the discharge nozzle 20 is always positioned perpendicularly above the frame flange 22.

FIG. 3 shows a further detail of an embodiment according to the invention. It is possible to see on the bracket arm 16, a guide wheel 29, which engages with an auxiliary cam 30. The auxiliary cam 30 and the wheel 29 are used for guiding the discharge nozzle 20 where, owing to an inadequate or lacking shoulder height of the frame flange 22, the scanning wheel 21 is no longer able to perform the guidance function.

The invention is not restricted to the above-described embodiments but variations and modifications may be made without departing from the scope of the invention as defined by the appended claims.

I claim:

1. Apparatus for applying viscous substances, for example adhesives, to the frame flanges of window openings in motor vehicles, said apparatus comprising an all-round rail shaped in accordance with a window opening to the frame of which said viscous substances are to be applied, a carriage displaceably arranged on said rail, and a discharge nozzle and a scanning unit mounted on said carriage, said scanning unit being engageable with the frame flange of said window opening to follow the same and having limited mobility with respect to said carriage, wherein the discharge nozzle is held by a bracket arm which is outwardly pivotable with respect to the all-round rail, said bracket arm is mounted on a guide column displaceable at right angles with respect to the plane of said rail and held by said carriage, and said scanning unit comprises a scanning wheel mounted on said bracket arm for scanning the window opening contour.

2. Apparatus as claimed in claim 1, in which the bracket arm is articulated to a slide which is radially movable with respect to the all-round rail and which is movable on cross-rails of said guide column.

3. Apparatus as claimed in claim 2, in which said slide is radially outwardly biassed by a spring with respect to the all-round rail and engages by a roller against a fixed guideway.

4. Apparatus as claimed in claim 1, in which a guide wheel is arranged on said bracket arm and is arranged to be applied to a fixed auxiliary cam over part of the path of said carriage on the rail.

5. Apparatus as claimed in claim 1, in which a chain is mounted on said rail and the carriage is advanced by means of a chain wheel which engages with the chain on said rail, the rolling line on said chain being aligned with the axis of the discharge nozzle in the operating position.

* * * * *